(12) United States Patent
Yatchak

(10) Patent No.: US 9,027,634 B2
(45) Date of Patent: May 12, 2015

(54) UNDERGROUND THERMAL BATTERY STORAGE SYSTEM

(76) Inventor: John R. Yatchak, Columbia Falls, MT (US)

( * ) Notice: Subject to any disclaimer, the term of this patent is extended or adjusted under 35 U.S.C. 154(b) by 792 days.

(21) Appl. No.: 13/107,960

(22) Filed: May 16, 2011

(65) Prior Publication Data
US 2012/0152488 A1    Jun. 21, 2012

Related U.S. Application Data

(60) Provisional application No. 61/345,095, filed on May 15, 2010.

(51) Int. Cl.
| | |
|---|---|
| F28D 17/00 | (2006.01) |
| F28D 19/00 | (2006.01) |
| F24J 3/08 | (2006.01) |
| F28F 13/00 | (2006.01) |
| F24D 11/00 | (2006.01) |
| F28D 20/00 | (2006.01) |
| F24D 17/00 | (2006.01) |
| F24D 19/10 | (2006.01) |
| F24D 17/02 | (2006.01) |

(52) U.S. Cl.
CPC ........ *F28D 20/0043* (2013.01); *F28D 20/0052* (2013.01); *F28F 13/00* (2013.01); *Y02E 60/147* (2013.01); *F28D 2020/0082* (2013.01); *Y02E 60/142* (2013.01); *F24D 17/0021* (2013.01); *F24D 19/106* (2013.01); *F24D 2200/11* (2013.01); *F24D 2200/12* (2013.01); *F24D 2200/14* (2013.01); *F24D 2220/08* (2013.01); *F24D 17/02* (2013.01); *Y02B 10/40* (2013.01); *Y02B 10/20* (2013.01); *Y02B 10/70* (2013.01); *F28F 2270/00* (2013.01)

(58) Field of Classification Search
CPC ... F28D 20/0052; F28D 17/02; F28D 17/005; F28D 17/00; F28D 19/02; F28F 13/00; Y02E 60/142; Y02E 60/147; Y02E 60/145
USPC ............ 165/10, 45, 135, 205, 236, 276, 277, 165/902, 11.1, 267, 287; 62/260, 130; 220/484; 405/53
See application file for complete search history.

(56) References Cited

U.S. PATENT DOCUMENTS

| | | | | |
|---|---|---|---|---|
| 2,856,506 | A | * | 10/1958 | Telkes ........................ 126/99 R |
| 3,677,008 | A | * | 7/1972 | Koutz ............................ 60/650 |
| 4,147,204 | A | * | 4/1979 | Pfenninger ...................... 165/4 |

(Continued)

OTHER PUBLICATIONS http://www.merriam-webster.com/dictionary/thermal%20insulation.*

*Primary Examiner* — Allen Flanigan
*Assistant Examiner* — Claire Rojohn, III
(74) *Attorney, Agent, or Firm* — David Kiewit

(57) ABSTRACT

'Underground Thermal Battery Storage System' using a battery structure of one or more underground thermally insulated cells, where each cell comprised of a waterproof thermal insulation shell, one or more fluid storage tanks and earth matrix. The thermal storage cell's fluid storage tanks are interconnected using a thermal fluid transport system with control valves, circulating pumps, and managed by a programmable controller. The programmable controller uses the cell sensors to determine cell status, control cell interconnections, and to manage the thermal charging and discharging by exterior heating or cooling devices. A moisture injection system is provided to control the thermal conductivity within the cell's earth matrix.

16 Claims, 4 Drawing Sheets

(56) References Cited

U.S. PATENT DOCUMENTS

| | | | |
|---|---|---|---|
| 4,150,547 A * | 4/1979 | Hobson | 60/659 |
| 4,344,414 A * | 8/1982 | Balch | 126/638 |
| 4,520,862 A * | 6/1985 | Helmbold | 165/10 |
| 4,566,281 A * | 1/1986 | Sandrock et al. | 62/46.3 |
| 6,059,016 A * | 5/2000 | Rafalovich et al. | 165/41 |
| 6,105,659 A * | 8/2000 | Pocol et al. | 165/10 |
| 6,672,372 B1 * | 1/2004 | Li et al. | 165/104.12 |
| 6,877,549 B2 * | 4/2005 | Hirano | 165/10 |
| 7,069,979 B2 * | 7/2006 | Tobias | 165/104.33 |
| 7,905,110 B2 * | 3/2011 | Reich et al. | 62/434 |
| 2002/0000306 A1 * | 1/2002 | Bradley | 165/10 |
| 2002/0134541 A1 * | 9/2002 | Nelson | 165/247 |
| 2002/0179298 A1 * | 12/2002 | Kopko | 165/201 |
| 2005/0247430 A1 * | 11/2005 | Gast | 165/10 |
| 2007/0209365 A1 * | 9/2007 | Hamer et al. | 60/648 |
| 2009/0101303 A1 * | 4/2009 | Henze | 165/10 |
| 2009/0277203 A1 * | 11/2009 | Dupraz | 62/238.7 |
| 2010/0000707 A1 * | 1/2010 | Tsubone et al. | 165/10 |

* cited by examiner

UNDERGROUND THERMAL BATTERY STORAGE SYSTEM

CROSS REFERENCE TO RELATED APPLICATION

This application claims benefit of Provisional Application 'Earth Rechargeable Thermal Storage System—Thermal Battery' dated May 15, 2010 with application No. 61/345,095.

FIELD OF INVENTION

The present invention concerns an improved method for an underground low temperature thermal storage system using a battery cell concept where buried individually insulated thermal storage cells can be interconnected using a fluid transport system with control valves, circulating pumps, and a programmable controller, allowing the cells to dynamically serve as heat sources or sinks.

Other's have recognized deficiencies in the current art for underground thermal energy storage system designs and have proposed various alternatives. In U.S. Pat. No. 4,361,135 Metz proposes an underground storage system beneath a home coupled to both a heat pump and using a solar array to charge the system. The underground storage system includes a octagonal tank surrounded at some distance by either vertical heat exchangers or a large cylindrical coil. This design also notes the need for a thermal insulation layer near the surface. The major drawbacks are the cost of the manufacture and installation of the underground storage system beneath the home, thermal energy losses in the earth, and limited thermal transfer rates between the storage tank and surrounding collection system. In US 2009/0277203 Dupraz proposes the use of a heat pump, and solar array coupled to an underground storage system. The underground storage system consists of a pocket or trench with an impermeable lower layer with the top open. The pocket is filled with water and a natural material. The design relies on rainfall to recharge the water in the pocket and will suffer in very dry climates. This design also suffers from losses both to the surface and surrounding earth in extreme hot or cold locations limiting its usefulness. Burying the pocket deeper will cause additional cost and moisture difficulties.

Energy stored in current underground storage system designs results in energy losses to the surrounding earth that cannot be reclaimed. The losses also make it difficult to determine the amount of energy that can be stored in the underground storage system as the rate of thermal energy loss to the surrounding earth is limited by the inherent properties of the earth and the temperature gradient.

The high cost of the earth based thermal storage systems has also limited their use.

SUMMARY OF THE INVENTION

The present invention describes a system to store thermal energy in an 'underground thermal battery storage system' structure. The 'underground thermal battery storage system' structure is comprised of one or more thermally insulated cell volumes where each cell volume contains a waterproof thermal insulation shell, one or more fluid storage tanks and surrounding earth matrix inside the thermal shell—which makes up the cell's thermal mass volume. A fluid thermal transport system with control valves and circulating pumps are used to thermally interconnect the fluid storage tanks and to transport the thermal energy into or out of the system. A programmable controller is used to monitor system temperature and moisture sensors, and to manage the fluid control valves and circulating pumps, allowing different series or parallel cell interconnections when two or more fluid storage tanks are used. The different cell interconnections allow the cells to be isolated under program control for independent heating or cooling functions or reprogrammed in various combinations depending on the thermal needs of the devices which interface with the system. It also allows control over the thermal transfer rates into and out of the cells.

It is well known that increasing the moisture content of soil also increases the soil's thermal conductivity. A water injection system is provided under the thermal shield for moisture control within the earth portion of each cell allowing control of the rate of thermal energy transfer and the thermal gradient between the water storage tank(s) and the surrounding earth matrix.

System temperature and moisture sensors provide status on the state of the storage system and also provide input to the control system which manages the thermal fluid transport system.

The lack of thermal containment is a major problem with underground thermal energy storage systems. Current art thermal storage systems use an insulation layer near the surface, as an attempt to limit thermal losses to the surface. Underground storage system energy loss is a 3 dimensional problem. Using a 3 dimensional thermal containment shield allows for higher temperature changes within the thermal storage system and allows more energy to be stored while reducing losses to the surrounding earth.

A particular feature of the system is allowing simultaneous heat sources and cold sinks within the 'underground thermal battery system' structure by using the system controller to direct the fluid flow from exterior heat source or sinks to different cells and thereby changing individual cell functions to either a sink or source under program control. Any thermal fluid source can be used to charge or discharge the storage cells but the design is particularly well suited for bidirectional heat pumps (source and sink), and surface heat exchangers such as solar collectors (source) or thermal radiators (sink). This allows use in heating and cooling of structures and other low temperature thermal process uses.

The current invention seeks to address a number of the problems with current underground thermal storage systems including: minimizing thermal energy loss to the surrounding earth; the ability to size the storage system for specific thermal requirements; ability to control the thermal conductivity within the storage system cells, low cost; ability to control the operation of the thermal fluid transport between the storage system cells and the devices providing or using the thermal energy which allows the devices to be used at an increased efficiency; using a battery structure to allow modularity and scalability to the capacity of the storage system; and the ability to easily retrofit to existing structures.

These and other features, advantages, and objects of the invention are evident in the following figures which depict the structure of the cells and several preferred embodiments.

DESCRIPTION OF PREFERRED EMBODIMENTS

The embodiments described herein are examples of the use of the invention. The present invention is not limited to these embodiments but can be generalized to any process requiring the use of a low temperature 'underground thermal battery storage system'.

Figure 1:
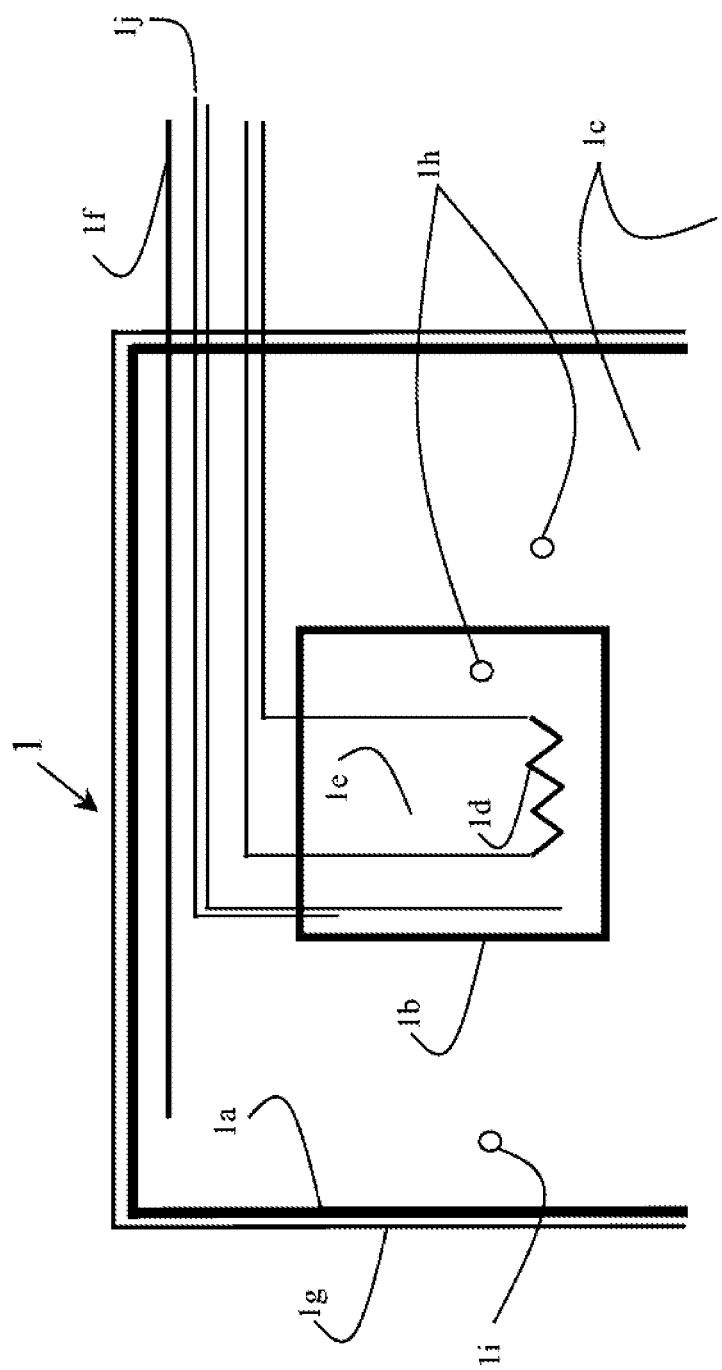
FIG. 1 is a cross section of a single cell—single tank—thermal energy storage system which is one embodiment of such an underground thermal battery storage system.

With reference to FIG. 1, which is a cross section of single tank—single cell volume embodiment of the 'Underground Thermal Battery Storage System'. The thermal shield is shown 1a extending the vertical length, width, and height of the cell. The thermal shield consists of rigid insulating foam. The thickness of the foam can be varied to provide sufficient reductions in thermal loss for the desired operating range of the cells. The thermal shield can be buried at any depth but will normally be buried 1 meter or more consistent with the structural strength of the tank. The bottom surface of the shield will not normally be installed as it allows the cell to be buffered by the surrounding deep soil temperature. Omitting the bottom of the thermal shield also minimizes cost of constructing the cell by minimizing the excavation costs. A water barrier is shown 1g as a separate layer but could also be applied to, or a feature of, the thermal insulating shield. The thermal shield need not extend the full height of the cell. A reduced thermal shield height would allow more thermal coupling to the surrounding earth outside the cell and is useful when the average local ground temperature is optimum for the intended use of the cell.

Moisture control lines 1f under the thermal shield can be used to control the thermal transfer rate from the cell earth matrix 1c to the fluid storage tank 1b. The moisture control lines are connected to a local pressurized water source through control valve 13 and are constructed as a series of linear lines with perforations and a common header connected to a single pressurized water supply line. The controller operates control valve 13 using input from moisture sensor 1i.

The fluid storage tank contains the tank fluid 1e which will be water under most circumstances due to environmental and cost considerations. The fluid storage tank can be any size consistent the required storage capacity of the cell but will normally be 500 to 2000 gallons based on structural considerations, cost and availability. Should the transport fluid be operated below freezing, the transport fluid will be an antifreeze solution and the fluid storage tank will contain an internal heat exchanger 1d. This minimizes the cost of the transport fluid. Solar collectors and fluid source heat pumps are designed to operate with fluids below 32 degrees F. Tank fill and circulation lines 1j are used as fill, drain, and circulation lines for the water solution in the tank. Temperature sensors 1h and moisture sensors 1i are placed strategically to provide data on the status of the cell and as inputs to programmable controller 12 shown in FIG. 3.

Figure 2:
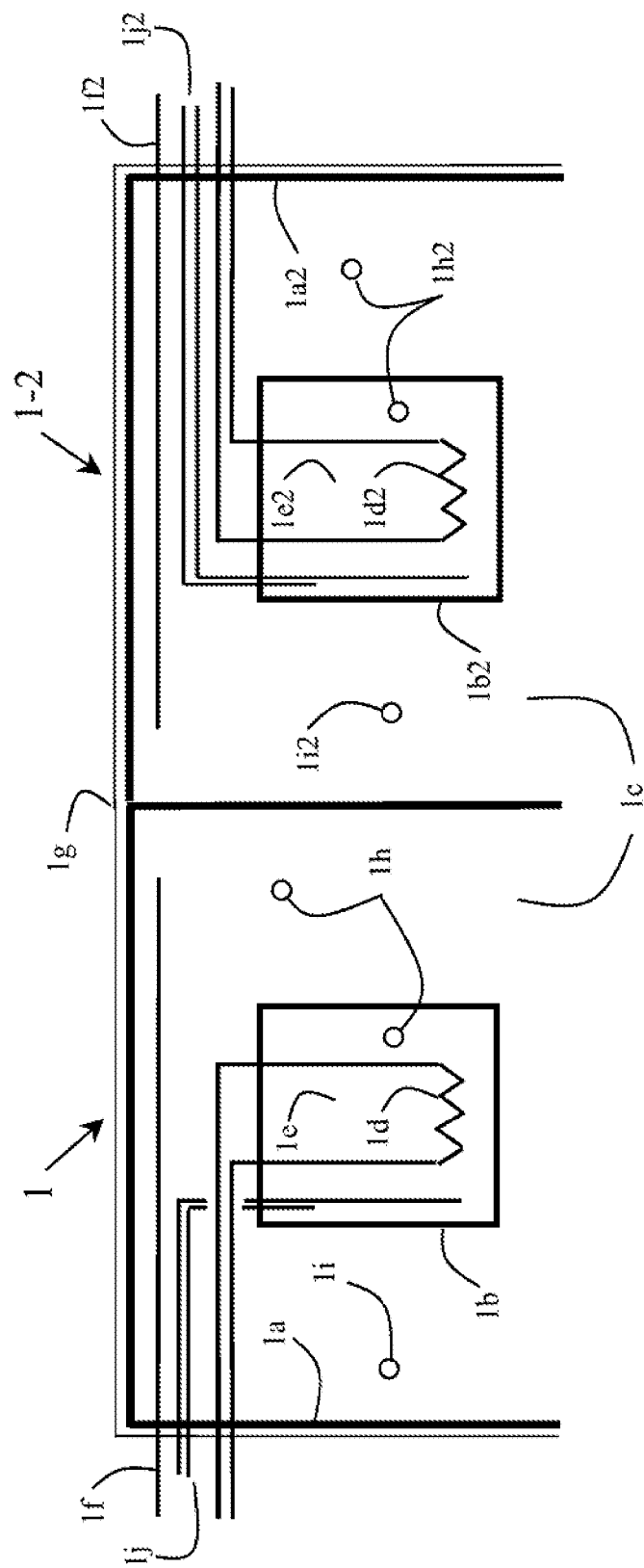
FIG. 2 is a cross section of a two cell—one tank per cell—thermal energy storage system which is one embodiment of such an underground thermal battery storage system
Figure 4:
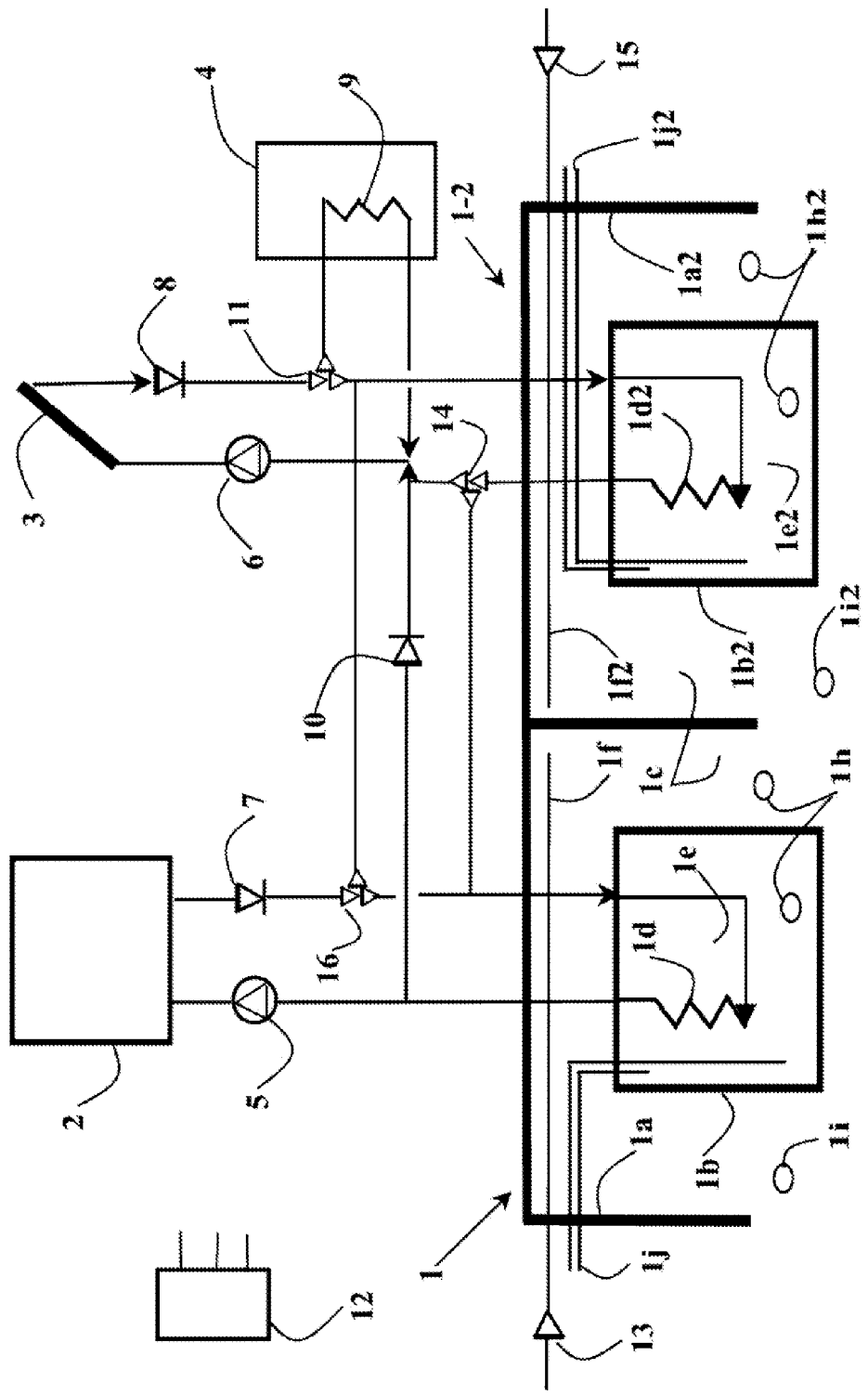
FIG. 4 is a diagram of a heat pump, surface solar collector, and a two cell underground thermal battery storage system which provides heating and cooling to the building as well as domestic hot water—which is a second embodiment of the use of the present invention.

FIG. 2 provides a cross section of a second embodiment of the 'Underground Thermal Battery Storage System'—a 2 cell 2 tank system. The details of second cell will be similar to the first cell but variations may exist. In particular the cell volume designated by the length, width, and height of cell 1-2 does not need to be the same as cell 1-1. The cell thermal storage capacity may vary. Similarly, the number and size of the fluid storage tanks may also vary, as well as the number and location of the sensors. Each cell can be designed to implement the operating thermal requirements of the end use energy devices both singularly and in combination. FIG. 4 provides an embodiment illustrating this concept. FIG. 4 also provides an example of the fluid transport system, control valves, and controller used to interconnect the thermal storage cells.

Performing an analysis using the volume of the fluid storage tank and the earth matrix, the volumetric heat capacities of the soil and storage tank fluid, and the operating temperature range of the cell; the thermal storage capacity of each cell and the thermal storage capacity of the 'Underground Thermal Battery Storage System' can be approximated.

Figure 3:
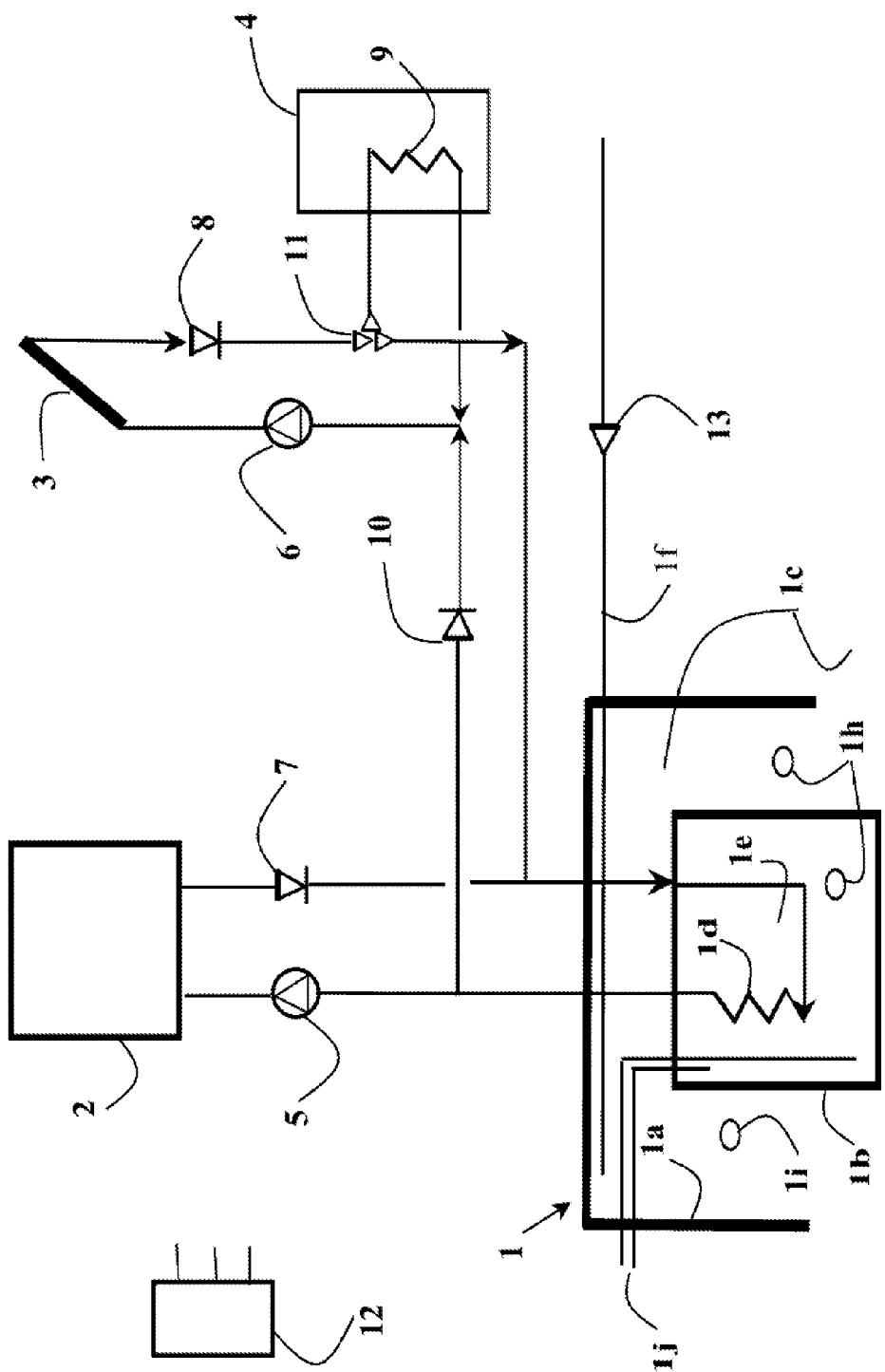
FIG. 3 is a diagram of a heat pump, surface solar collector, and a single cell underground thermal battery storage subsystem which provides heating and cooling to a building as well as domestic hot water—which is one embodiment of the use of the present invention.

FIG. 3 provides an embodiment of a simple heating and cooling system for a structure or thermal processes using a single cell—single tank 'Underground Thermal Battery Storage System'. The details of the single cell 'Underground Thermal Battery Storage System' is the same as described in FIG. 1. This embodiment describes a heating and cooling system using a fluid source heat pump and solar collector array. The thermal transport system fluid paths are called fluid loops. The system shows three separate fluid loops. The first fluid loop originates at the output of the storage tank 1b heat exchanger 1d and utilizes the circulating pump 5 to provide thermal fluid flow through the heat pump 2 and check valve 7 return it to the tank heat exchanger 1d. The first fluid loop is both a source and sink for the 'Underground Thermal Battery Storage System' depending on whether the heat pump operates in cooling or heating mode respectively. The second fluid loop also originates at the output of heat exchanger 1d, through check valve 10, the solar circulating pump 6, through the solar collectors 3, check valve 8, and control valve 11, returning to the tank heat exchanger 1d. The second fluid loop is a sink for the thermal energy generated by the solar collectors 3. The third fluid loop uses the solar circulating pump 6 and provides fluid flow through the solar collectors 3, check valve 8, control valve 11, and the hot water tank 4—heat exchanger 9, and returns to the solar circulating pump. The third fluid loop is a domestic hot water loop heating the potable water in the hot water tank 4. Each fluid loop operates independently. The heat pump fluid loop 1 and the solar collector fluid loop 2 can operate in tandem. In this case the output of the solar collectors and the heat pump combine before entering the tank heat exchanger 1d. System controller 12 monitors system temperatures and controls the operation of control valve 11, and the circulating pumps 5,6. The moisture control system 1f is controlled by control valve 13 using the system controller 12 and the moisture sensor 1i. The moisture system is connected to an available pressurized water system.

FIG. 4 provides an embodiment of a heating and cooling system for a structure or thermal processes using a 2 cell-2 tank 'Underground Thermal Battery storage system', fluid source heat pump and a solar collector array. The embodiment differs from the one in FIG. 3 by the addition of a second storage cell 1-2 and fluid transport control valves 14,15,16, a moisture control system for the second cell 1f/2, and a fourth and fifth fluid loop. The first loop fluid loop starts at the output of storage cell 1 heat exchanger 1d, circulating pump 5, through heat pump 2, check valve 7, control valve 16 and back to cell 1 fluid storage tank 1b through heat exchanger 1d. The second fluid flow loop also originates at the output of the storage cell 1 heat exchanger 1*d* and utilizes check valve 10, the solar circulating pump 6, through the solar collectors 3, check valve 8, and control valve 11, passing through storage cell 1-2 heat exchanger 1*d*2, through control valve 14, and returning to the storage cell 1 tank heat exchanger 1*d*. The third fluid loop is the same as the third fluid loop in FIG. 3. The fourth fluid loop starts at the output of storage cell 1-2 heat exchanger 1*d*2, passes through fluid control valve 14, circulating pump 6, solar collectors 3, check valve 8, fluid control valve 11, and back to the input of heat exchanger 1*d*2. The fifth fluid loop starts at the output of storage cell 1 heat exchanger 1*d*, through circulating pump 5, through heat pump 2, check valve 7, control valve 16, through storage cell 1-2 heat exchanger 1*d*2, through control valve 14, and back to the input of storage cell 1 heat exchanger 1*d*. The moisture control system 1/2, is controlled by control valve 15, using the system controller 12 and the moisture sensor 1*i*2 in cell 1-2.

The first fluid loop allows thermal charging and discharging of storage cell 1 to be controlled by heat pump 2. The storage cell temperature can be maintained to optimize the fluid source temperature for the heat pump allowing the heat pump to operate at a higher efficiency. The second fluid loop allows the heat pump 2 and solar collectors 3 to operate in tandem minimizing the load on the storage system cells 1, 1-2. The third fluid loop allows the heating of the domestic hot water tank 4. The fourth fluid loop allows the solar collectors to operate with only storage cell 1-2 allowing the solar collectors to operate at a high efficiency. The fifth fluid loop allows the heat pump to be fed by storage cells 1 and 1-2 providing a larger thermal capacity and higher thermal transfer rate. The system controller 12 monitors and displays the system sensors, and controls fluid control valves 11, 13, 14, 15, 16, and the circulating pumps 5,6.

The application of the invention is to provide an 'Underground Thermal Battery Storage System' for use in many different types of low temperature heating and cooling uses in structures and thermal processes within the following claims.

I claim:

1. An apparatus for storing thermal energy, the apparatus comprising at least one thermally shielded cell buried beneath a surface of the earth, the at least one cell comprising: at least one thermal fluid storage tank; an earth matrix surrounding the thermal fluid storage tank; a water-impermeable thermally insulating shell spaced apart from the tank by a portion of the earth matrix, the thermally insulating shell comprising a top portion disposed above the thermal fluid storage tank and a side portion depending from the top portion, there being no portion of the thermally insulating shell extending beneath a bottom of the tank; and a water injection apparatus disposed between a top of the thermal fluid storage tank and the top portion of the thermally insulating shell; wherein the thermal fluid storage tank is thermally coupled to at least one above-ground heat exchanger by a thermal fluid transport system.

2. The apparatus of claim 1, wherein the side portion of the thermally insulating shell extends downwardly into the earth at least as far as the bottom of the thermal fluid storage tank.

3. The apparatus of claim 1, wherein the thermally insulating shell comprises rigid foam.

4. The apparatus of claim 1, wherein the side portion of the thermally insulating shell extends downwardly into the earth at least as far as the top of the thermal fluid storage tank, but not as far as the bottom thereof.

5. The apparatus of claim 1, further comprising a tank heat exchanger disposed within the thermal fluid storage tank.

6. The apparatus of claim 1 wherein the water injection apparatus comprises piping connected to a pressurized water system.

7. The apparatus of claim 1, wherein the earth matrix comprises natural on site soils.

8. The apparatus of claim 1, wherein the thermal fluid storage tank contains a water solution transportable by the fluid transport system to directly exchange heat with the at least one above ground heat exchanger.

9. The apparatus of claim 1, wherein the thermal fluid storage tank comprises a heat exchanger operable to exchange heat between a water solution in the thermal fluid storage tank and the at least one above ground heat exchanger wherein the fluid transported by the fluid transport system comprises an anti-freeze thermal transport fluid.

10. The apparatus of claim 1 wherein at least one temperature sensor is disposed in the earth matrix.

11. The apparatus of claim 1 wherein at least one temperature sensor is disposed in the tank.

12. The apparatus of claim 1 wherein the above-ground heat exchanger comprises a portion of a heat pump.

13. The apparatus of claim 1 wherein the above-ground heat exchanger comprises a thermal radiator.

14. The apparatus of claim 1 wherein the above-ground heat exchanger comprises a thermal collector.

15. The apparatus of claim 1 further comprising at least a second thermally shielded cell juxtaposed with and sharing a common insulating shell side portion with the first thermally insulated cell, the second thermally insulated cell thermally coupled to the at least one above-ground heat exchanger.

16. The apparatus of claim 1 wherein at least one moisture sensor is disposed in the earth matrix.

\* \* \* \* \*